United States Patent [19]
Mohrman et al.

[11] 3,795,007
[45] Feb. 26, 1974

[54] RECORDER WITH CHART LOCATION REFERENCE MEANS

[75] Inventors: James A. Mohrman; Howard A. Sanford, both of Columbus, Ohio

[73] Assignee: Telmar, Inc., Columbus, Ohio

[22] Filed: Nov. 26, 1971

[21] Appl. No.: 202,549

Related U.S. Application Data

[63] Continuation of Ser. No. 19,029, March 12, 1970, abandoned.

[52] U.S. Cl.............. 346/32, 250/219 DR, 346/134
[51] Int. Cl. .............................................. G01d 9/40
[58] Field of Search ............ 346/33 A, 44, 134, 32; 250/219 DR

[56] References Cited
UNITED STATES PATENTS

| 3,058,111 | 10/1962 | Duncombe | 346/32 X |
| 3,113,313 | 12/1963 | Roberts | 346/32 X |
| 3,149,900 | 4/1964 | Van Horne et al. | 346/17 |

Primary Examiner—Joseph W. Hartary
Attorney, Agent, or Firm—Palmer Fultz, Esq.

[57] ABSTRACT

A recorder characterized by a chart, a chart location reference means, and associated marking means for marking values on said chart. The marking means is enabled to record a variable on the chart in response to the sensing of the chart location reference means by a light sensitive sensor means.

4 Claims, 6 Drawing Figures

INVENTORS
HOWARD A. SANFORD
BY JAMES A. MOHRMAN

Schmieding & Fultz
ATTORNEYS

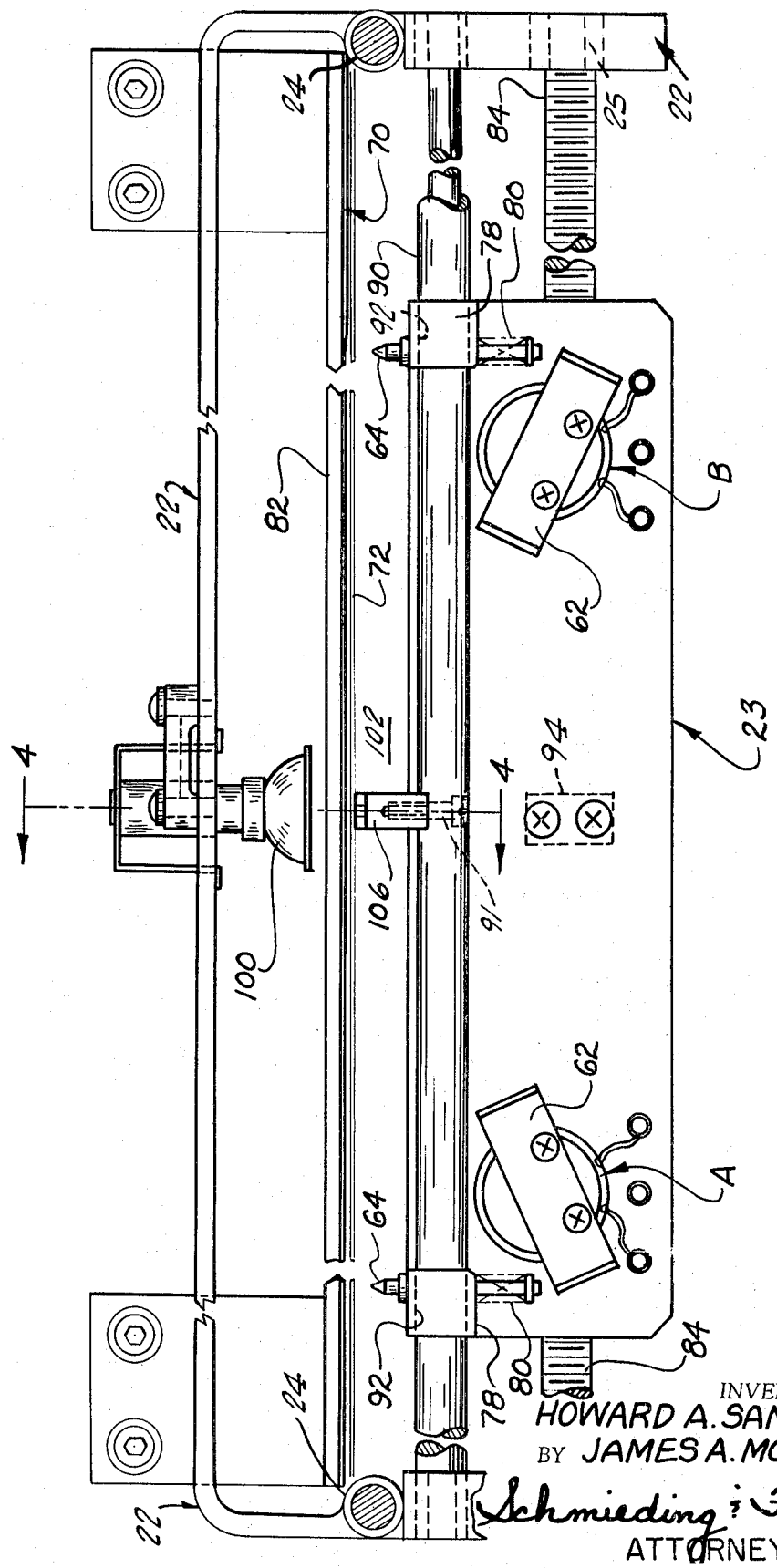

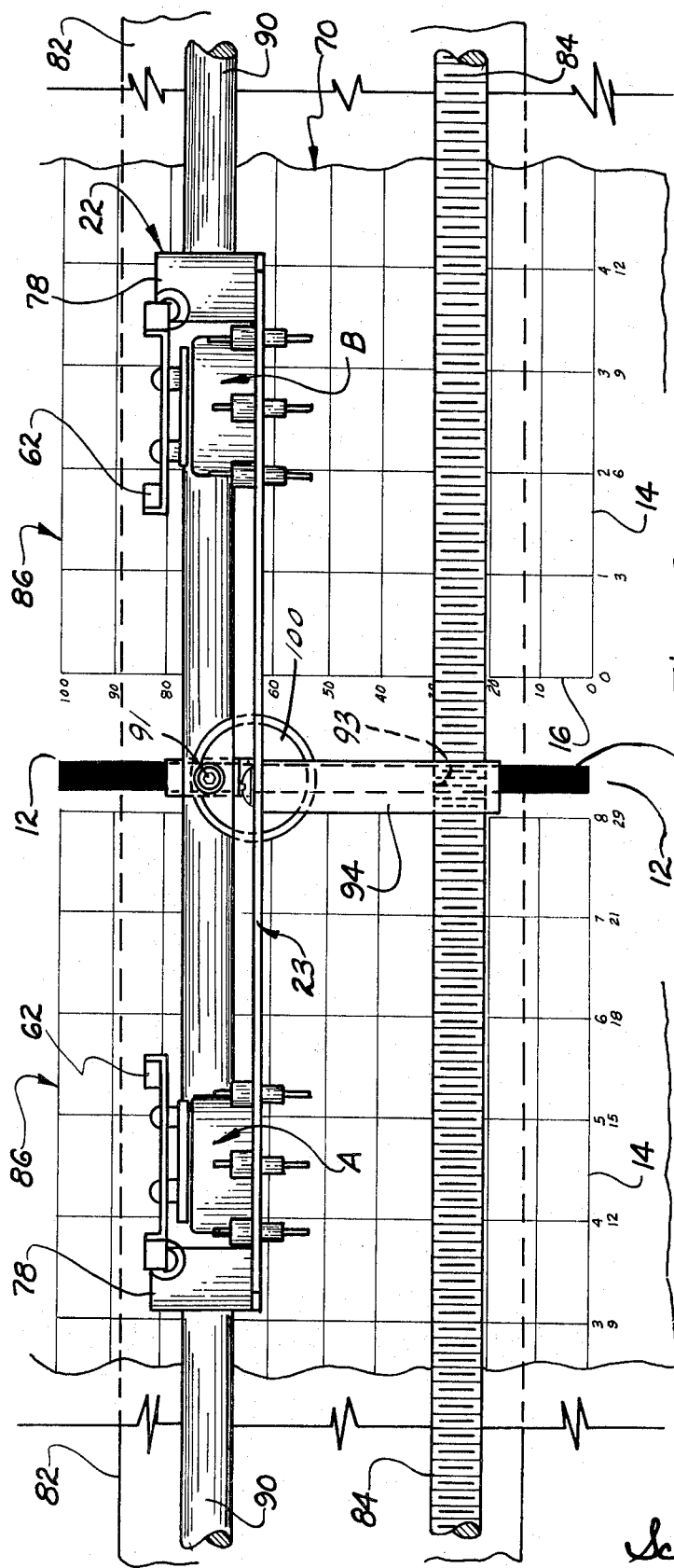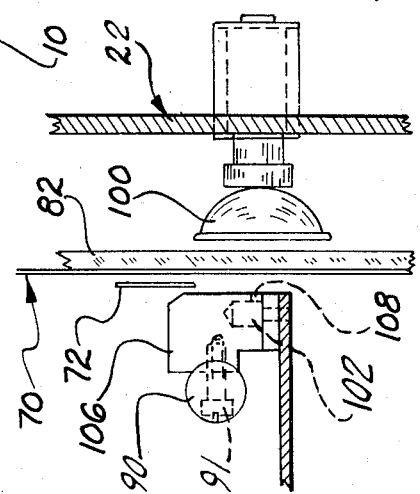

RECORDER WITH CHART LOCATION REFERENCE MEANS

This application is a continuation of application Ser. No. 19,029, filed Mar. 12, 1970, now abandoned.

This invention relates to recording systems and more particularly to chart type recorders used to record the changes in any selected dependent variable with respect to an independent variable such as time.

In general, the typical graphic recorder constructed in accordance with the present invention is provided with a master sheet of paper printed with a number of separate charts, or graphs, aligned in columns and rows. Each chart is used to record a separate dependent variable with respect to an associated independent variable such as time. A chart trace is recorded on the chart frame by a marking means in the form of a traveling print bar, provided with a stylus, which periodically scans vertically up and down across the paper. The print bar includes solenoid operated hammers which print dots through a typewriter ribbon. As time passes and the print bar and stylus move horizontally along the time axis, the dots are produced in the direction of this axis to form a continuous line that graphically represents variations of the recorded dependent variable with respect to time or other selected independent variable.

A problem has been present in recording apparatus of this type in that the material from which the charts are fabricated, such as paper and like material, is subject to dimensional changes caused by variations in ambient conditions such as humidity. This results in changes in position and dimension of co-ordinates marked on the charts or graphs have resulted in inaccuracies of the information recorded thereon.

As another inherent problem, inaccuracies have occurred due to operator error in mounting the chart in place on the machine.

In instances where maximum accuracy has been required, some prior chart type recorders have included clamping and stretching apparatus for minimizing dimensional changes in the chart material by prestretching same over a platen. Such prior prestretching techniques have, however, required expensive stretch mechanisms which have been troublesome and limited as to the degree of improvement in accuracy that is achieved.

In accordance with the present invention, a novel recording apparatus is provided that eliminates the above described inaccuracies by utilizing a novel chart construction provided with a chart location reference means precisely located with respect to the charts. This is used in combination with a novel control means for the traveling printing means of the recorder that produces the trace on the charts. Such control means includes a sensor for the above mentioned chart location reference means and functions to precisely institute operation of the printing means by precisely indexing same with respect to datum references, such as a zero value line S on the charts.

It is therefore an object of the present invention to provide an improved graphic recording apparatus wherein the marking means for producing indicia on charts is prjcisely indexed and referenced with respect to datum references on said charts notwithstanding any dimensional variations which may occur in the chart material.

It is another object of the present invention to provide an improved recording apparatus of the type described that functions to electronically generate ramps for recording variables wherein a reference point on the ramp is electronically indexed with a datum reference on a respective chart on which the variables are recorded.

It is another object of the present invention to provide a recording apparatus of the type described that utilizes recording sheets wherein a plurality of individual charts are provided in rows and columns of each sheet, for the accurate and convenient comparison of a plurality of variables with each of said plurality of charts on the sheet having its respective reference datum individually and precisely indexed with respect to the printing means that marks the respective variable on the chart.

It is still another object of the present invention to provide novel recording sheet construction wherein a plurality of individual charts are provided on a single sheet with each of the charts on said sheet including a respective zero datum which in the preferred embodiment, is provided by the junction of a light transmitting sheet portion and light obstructing sheet portion which junction is precisely sensed by a beam of light.

Further objects and advantages of the present invention will be apparent from the following description, reference being had to the accompanying drawings wherein a preferred form of embodiment of the invention is clearly shown.

IN THE DRAWINGS

FIG. 2 is a partial top elevational view of the recording apparatus of FIG. 1;

FIG. 3 is a partial front elevational view of the recording apparatus of the preceding figures;

FIG. 4 is a partial side sectional view taken along the line 4—4 of FIG. 2;

Figure 6:
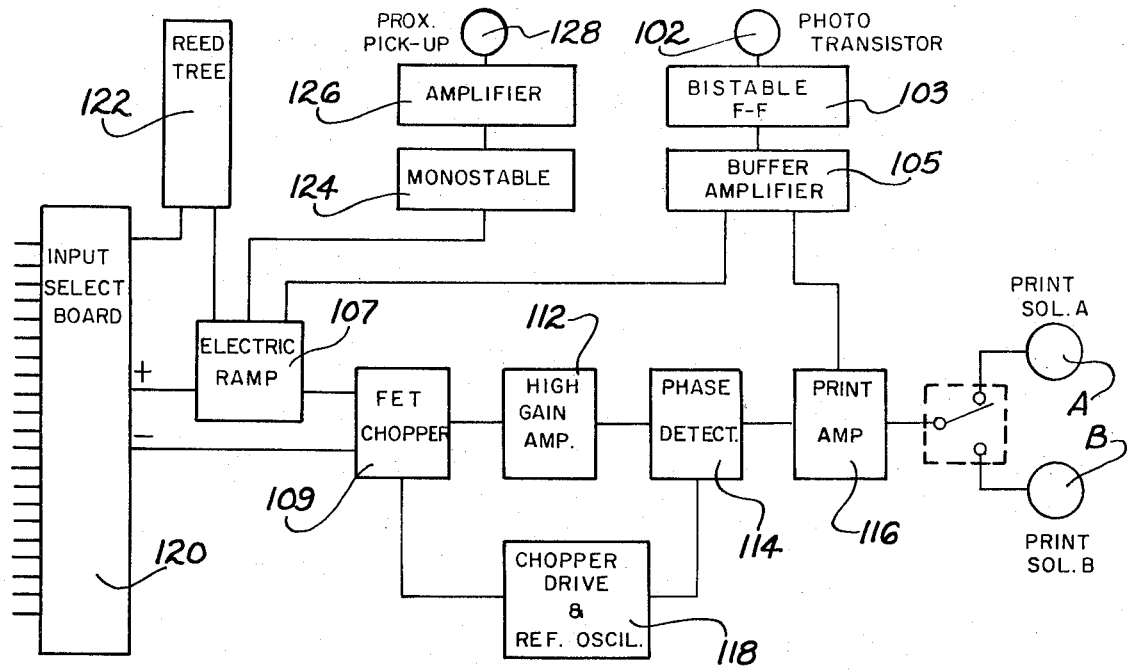
FIG. 6 is a block diagrammatic view of a control circuit comprising a portion of the recording apparatus of the preceding figures.

Referring in detail to the drawings, a recording apparatus constructed in accordance with the present invention includes a frame indicated generally at 20 that includes a print bar assembly indicated generally at 22. Such print bar 22 is mounted for vertical movement on a pair of spaced guide rods 24, FIG. 1, with sleeves 26 on print bar 22 including bores 28 which slide along vertical guide rods 24. Print bar 22 is driven for reciprocating movement along guide rods 24 by an endless chain 30 mounted on pulleys 32 and 34 with the shaft of one of said pulleys being driven by a reversible motor, not illustrated.

Figure 1:
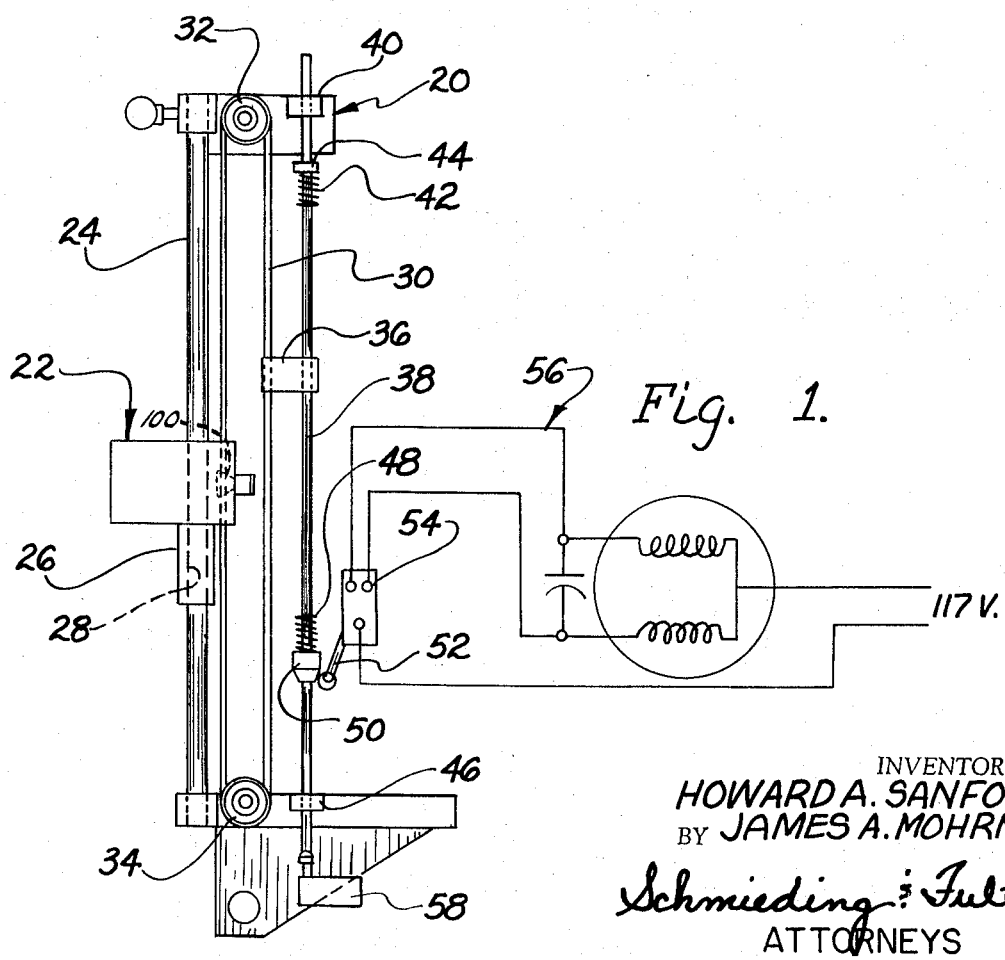
FIG. 1 is a partial side elevational view of a recording apparatus constructed in accordance with the present invention.

As is best seen in FIG. 1, chain 30 includes a switch actuator block 36 mounted for sliding movement on a vertically disposed reversing rod 38, said reversing rod being spring mounted to frame 20 by an upper guide 40, upper spring 42, upper spring retainer 44, lower guide 46 and lower spring 48.

A switch actuator reversing cam 50 is mounted on reversing rod 38 and when engaged by reversing block 36 triggers an arm 52 on a reversing switch 54 which reverses the polarity of a reversing circuit indicated generally at 56 which in turn reverses the previously described motor for driving chain 30.

It should be mentioned that a stop 58 is provided at the lower end of reversing rod 38.

It will now be understood that the apparatus illustrated in FIG. 1 functions to cause the continuous upward, downward, and reversing cycling of the print bar assembly whereby such assembly continuously scans the chart sheet 70.

At this point it should be mentioned that in a typical assembly each vertical pass takes, for example, five seconds and prints the amplitude information on a plurality of variables on their respective charts. For example, five variables per column on a chart sheet such as is illustrated generally at 70 in FIG. 5. After four vertical passes consuming 20 seconds, 20 inputs will have been scanned and recorded.

Figure 5:
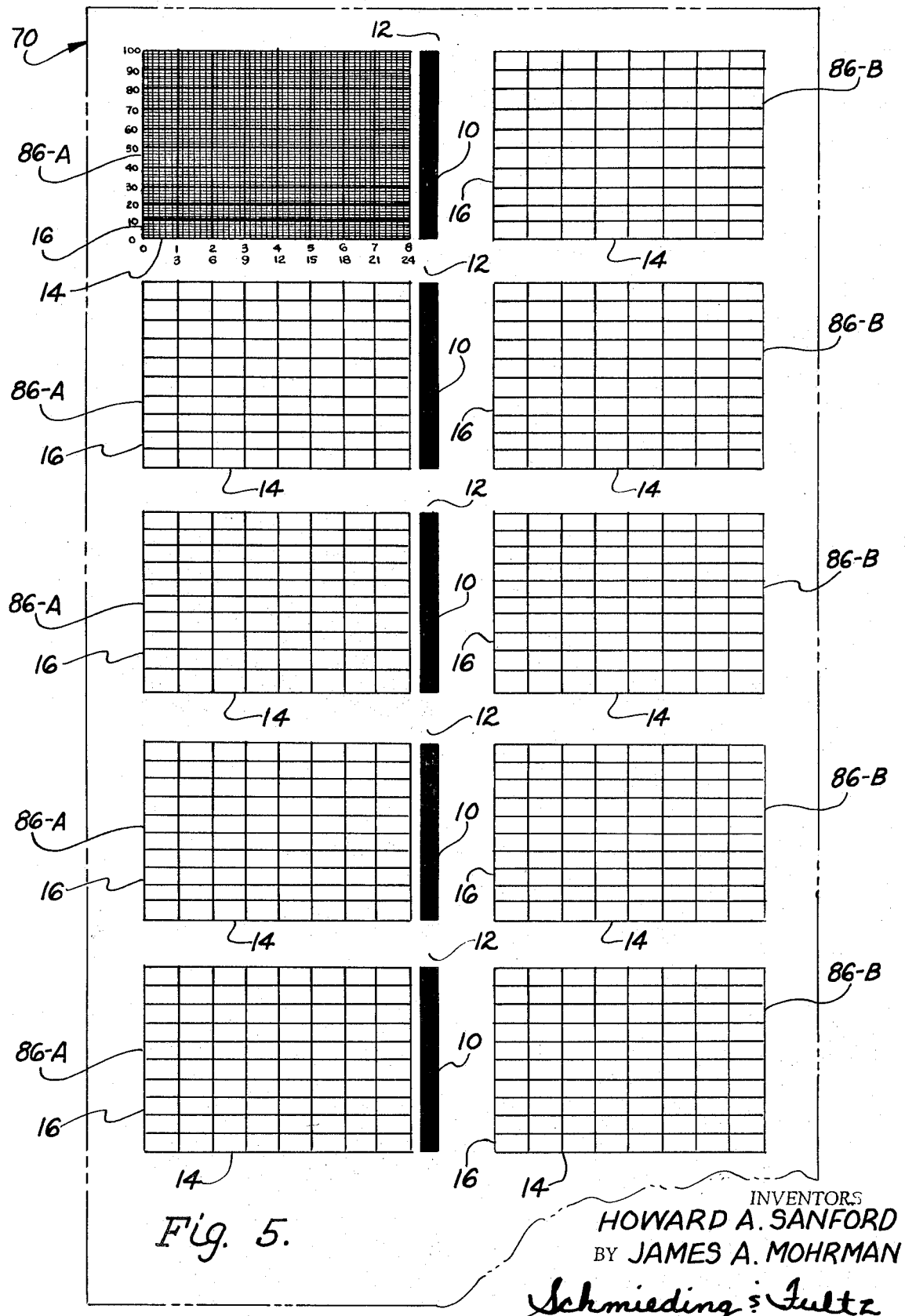
FIG. 5 is a plan view of a sheet of charts constructed in accordance with the present invention.

It should further be mentioned that the sheet of FIG. 5 is, for example, completed every eight or twenty-four hours depending on the selected setting for horizontal traveling time of print bar 22.

Referring next to FIGS. 2, 3 and 4, the actual printing on the sheet is accomplished by print bar assembly 22 which includes, for example, two separate marking means preferably in the form of rotary type solenoids indicated generally at A and B, and each of these solenoids comprises an electrically actuated hammer 62 which strikes a slideably mounted printer 64 that functions like the "period" key on a typewriter and prints dots on a sheet indicated generally at 70 by striking an ink-impregnated ribbon 72.

The dots produced by printer or marker 64 are slowly displaced to the right in the direction of the horizontal axes or reference data 14 of charts 86-A and 86-B with the passage of time to form continuous lines on the charts which represent the recorded variables. The markers 64 are sharpened steel pins which are slideably mounted in holes in guides 78 and include return springs 80 which withdraw the printers after each time they are struck by hammers 62.

Solenoids A and B are preferably of the rotary type selected for extreme speed of response and long life.

In a typical installation, sheet 70 is oriented as shown in FIG. 5 and mounted on a vertically disposed platen 82 mounted on frame 20 and formed of translucent plexiglass, or the like, that permits the passage of light to and through recording sheets 70.

As seen in FIGS. 2 and 3, a time advance screw 84 is also mounted on frame 20 and driven at precisely uniform speed by a synchronous motor so as to constantly move print bar 22 from left to right in the direction of the prespective horizontal axes 14 of the plurality of charts 86.

As is best seen in FIGS. 2 and 3, print bar 22 includes a horizontal guide rod 90 that slideably receives bores 92 formed in print rod guides 78 and advance screw 84 drives print bar assembly 22 along said guide rod by the engagement of threads on time advanced screw 84 with a threaded bore 93 formed in a bracket 94 extending downwardly from the print bar assembly.

Referring next to FIG. 4, a sensor means for referencing the previously mentioned printer 22 and associated electronic circuit is illustrated in enlarged detail and, in general, provides means for precisely indexing print bar assembly 22 with each of the charts 86-A or 86-B as such print bar assembly sweeps vertically across chart sheet 70 as previously described.

Referring in detail to FIG. 4, the sensor means comprises a traveling light source 100 mounted for movement on frame 20 adjacent to the rear side of platen 82 so as to direct a beam of light through platen 82, formed of translucent plexiglass or the like, and thence through translucent sheet material 70 such that the light beam is intercepted by a photoelectric cell 102. The photoelectric unit 102 includes an aperture 108 which defines a localized beam of light from the overall emission that is transmitted through aperture 108 in bracket 104 to the light sensitive element of the photo cell 102.

In view of the above, it will now be understood that as the print bar 22 is scanned vertically, in the manner previously described, it will pass along a path centrally of sheet 70 which includes opaque vertically disposed light interrupting sections or bars 10, one for each of the charts 86-A and 86-B, which bars form chart locating reference means.

It should also be mentioned that recording sheet 70 includes intermediate said opaque marks 10 translucent or transparent portions of sheet 70 indicated generally at 12 and when opaque portions 10 confront the traveling print bar 22, including its photoelectric cell 102 and associated light source 100, such opaque portions 10 interrupt transmission of the light beam from source 100 to photo cell 102. Hence it will be understood that opaque marks 10 and, more particularly, the ends thereof form char location reference means for charts 86-A and 86-B. Moreover, the print bar 22 progresses to next succeeding charts and respective light transmitting portions 12 are successively encountered at the terminal ends of opaque strips 10, whereby the electronic circuit is reset in a manner later to be described, so as to properly locate the print bar assembly 22 with respect to the reference datum 14 of each chart 70.

Reference is next made to FIG. 6 which is a block diagram of the electronic control system for indexing operation of the print solenoid A and B and their associated printers 64, responsive to detection of the chart location reference means in the form of opaque bars 10 provided on recording sheet 70.

As seen in FIG. 6, the previously mentioned photo transistor 102 senses variations in light intensity from light source 100 located behind light transmitting platen 82, print bar assembly 22 passes from a transparent recording sheet section 12 to an opqaue sheet section 10.

It will be understood that other datum forming means and sensing means can be used without departing from the spirit of the present invention. For example, magnetic ink can be used on the chart sheet to provide zero data for the charts and such data can be sensed by magnetic sensors.

The light sensitive transistor 102 is part of a simple Schmitt Trigger, and referring to the output of such Schmitt Trigger, when the printers are between individual charts 86A and 86B, a buffer amplifier 105 drives a reed relay 122 which functions to reset an electronic ramp 107 and prevents actuation of print solenoids A and B when printers 64 are not registered with charts 86-A and 86-B.

With continued reference to FIG. 6, a high gain AC amplifier 112 amplifies a chopped DC from FET Chopper 109 to a sufficient amplitude for use in a phase detector 114. Such phase detector senses 180° phase changes which take place when the electronic ramp 107 voltage becomes greater than the input voltage from an input select board 120.

A print amplifier 116 amplifies the signal produced in the above mentioned phase detector 114, at a 180° phase change, to sufficient power to drive print solenoids A and B.

As previously described, print solenoids A and B convert electric impulses to mechanical motion that precisely and selectively drive hammers 62 against markers 64 to produce the dots that form the traces on the charts as previously described.

With continued reference to FIG. 6, a proximity pickup 128 is positioned adjacent to a ferris metal gear, not illustrated, mounted on the shaft of the previously mentioned induction motor and such pickup 128 magnetically senses the sequential passage of teeth on such gear as the motor operates to provide electrical pulses directly proportional in frequency with the speed of the motor.

An amplifier 126 functions to amplify such pulses from proximity pickup 128 to sufficient amplitude to trigger a monostable 124, the latter functioning to establish the height and width of pulses from proximity pickup 128 at fixed values independent of time, temperature and other variable s.

With continued reference to FIG. 6, an FET Chopper 109 receives DC voltage from electronic ramp and input select board 120 and chops such voltage into an AC signal so that such signal can be amplified by high gain AC amplifier 112.

Reference is next made to a chopper drive and reference oscillator 118 which functions to supply the signal to drive FET Chopper 109, as well as a signal of fixed phase, to phase detector 114 the phase of which signal is compared with the phase of the chopped DC signal.

With continued reference to FIG. 6, a mechanically operated column selector switch 117 functions to selectively connect either column A print solenoid A or the column B print solenoid B at the appropriate time.

A reed tree 122 supplies row information to input select board 120 and such input select board functions to isolate appropriate input signal to be connected to the amplifier circuit consisting of elements 107, 109, 112, 114, 116 and 118.

With continued reference to FIG. 6, electronic ramp 107 is an electronic integrator that builds a ramp voltage for each of the charts 86-A and 86-B from pulses supplied by the previously described proximity pickup 128. In general the voltage of a ramp at any instant of time is directly proportional to the position of one of the printers 64 over a particular chart for its respective ramp and is independent of the speed of the induction motor.

A typical example of this method of recording on each of the charts 86-A and 86-B is to display a simple, accurate and understandable picture of, for example, the operation of a respective one of a plurality of production machines or processes. On each of the charts 86-A and 86-B a record is made for a respective one of each of a plurality of machines or processes minute by minute.

In operation of the chart indexing apparatus of the present invention, as print bar 22 is scanned vertically when the beam of light from light source 100 passes through platen 82, chart 70 and aperture 108 encounter a lower edge of an opaque chart section 10 and is thereby interrupted. Such interruption is sensed by photo transistor 102 thereby energizing the circuit of FIG. 6 in precise indexed relationship with a datum reference, such as the bottom horizontal axis 14 of a chart 86-A or 86-B.

The electronic ramp generation is thereby instituted precisely when the printers 64 are at such reference data and this will always occur notwithstanding any changes in location of the chart reference data which may have been imposed by changes in ambient conditions, such as humidity.

It will now be understood that as print bar 22 progresses upwardly the light beam from source 100 will encounter the upper end of the opaque chart section 10 it is scanning and when it encounters the next transparent chart section 12 this is sensed by the transmission of light to photo transistor 102 with a resulting response in the associated circuit of FIG. 6. The electronic ramp is thereby terminated and the circuit is reset to start the next electronic ramp for the chart next above as soon as the light beam encounters the next opaque chart section 10. It should further be mentioned that on the down sweep of the print bar the same functioning of the opaque strips 10 and associated control circuit of FIG. 6, can be utilized for recording variables on the down sweep of print bar 22.

I claim:

1. A variable-function recorder comprising, in combination, recorder frame means including spaced vertically extending guides and a platen ; a print bar mounted for travel in a first direction on said guides adjacent said platen; a recording sheet mounted on said platen, and including a chart provided with a reference datum for said variable printed thereon and a chart locating reference means for locating said chart in said first direction ; sensor means carried by said print bar in a path of movement that intercepts said chart locating reference means for sensing said chart locating reference means ; marker means on said print bar for recording a variable on said chart; means for moving said print bar in a second direction transversely of said first direction across said sheet at a rate of movement proportional to a function to be recorded on said chart; and means for enabling said marker means to record said variable on said chart in response to the sensing of said chart locating means by said sensor means.

2. The recorder defined in claim 1 wherein said sheet includes a plurality of individual charts arranged in a predetermined array for recording a plurality of variables each of said charts including a respective chart locating reference means in the path of said sensor means.

3. A variable-function recorder comprising, in combination, recorder frame means including spaced vertically extending guides and a platen; a print bar mounted for travel in a first direction on said guides adjacent said platen; a recording sheet mounted on said platen and including a chart provided with a light effecting sheet portion forming a chart locating reference means for locating said chart in said first direction; sensor means carried by said print bar in a path of movement that intercepts said chart locating reference means for sensing said chart locating reference means, and including a light source for directing light at said sheet and light effecting sheet portion and a light sensitive element for receiving said light and thereby sensing said chart locating reference means; marker means on said print bar for recording a variable on said chart; means for moving said print bar transversely of said first direction across said sheet at a rate of movement proportional to a function to be recorded on said chart; and electronic means in circuit with said light sensitive element for enabling said marker means to record said variable on said chart in response to the sensing of said chart locating means by said sensor means.

4. The recorder defined in claim 3 wherein said sheet includes a plurality of individual charts in a predetermined array for recording a plurality of variables, each of said charts including a respective light effecting sheet portion in the path of said sensor means.

* * * * *